United States Patent [19]

Mullin

[11] Patent Number: 5,339,697
[45] Date of Patent: Aug. 23, 1994

[54] MULTI-AXIS LOAD CELL

[75] Inventor: Robert L. Mullin, Eden Prairie, Minn.

[73] Assignee: MTS Systems Corporation, Eden Prairie, Minn.

[21] Appl. No.: 943,761

[22] Filed: Sep. 11, 1992

[51] Int. Cl.⁵ .................................................. G01L 5/00
[52] U.S. Cl. ............................ 73/862.043; 73/862.041
[58] Field of Search ............. 73/146, 146.02, 862.041, 73/862.042, 862.043, 862.044

[56] References Cited

U.S. PATENT DOCUMENTS

| | | | |
|---|---|---|---|
| 3,618,376 | 11/1971 | Shull | 73/141 A |
| 3,771,359 | 11/1973 | Shoberg | 73/141 A |
| 4,483,203 | 11/1984 | Capper | 73/862.04 |
| 4,488,441 | 12/1984 | Ramming | 73/862.04 |
| 4,550,617 | 11/1985 | Fraignier et al. | 73/862.04 |
| 4,573,362 | 3/1986 | Amlani | 73/862.04 |
| 4,640,138 | 2/1987 | Meyer et al. | 73/862.04 |
| 4,753,110 | 6/1988 | Burchett et al. | 73/862.043 |
| 4,763,531 | 8/1988 | Dieterich et al. | 73/862.04 |
| 4,821,582 | 4/1989 | Meyer et al. | 73/862.04 |

*Primary Examiner*—Richard E. Chilcot, Jr.
*Assistant Examiner*—R. Biegel
*Attorney, Agent, or Firm*—Westman, Champlin & Kelly

[57] ABSTRACT

A structural assembly that measures forces along and moments about three orthogonal axis with very low cross-talk or likelihood of affecting the reading the in one axis from loads and in another axis is disclosed. The assembly comprises a compact assembly having orthogonal links oriented in a nested arrangement in different planes and within recesses of the assembly.

19 Claims, 3 Drawing Sheets

MULTI-AXIS LOAD CELL

BACKGROUND OF THE INVENTION

The present invention relates to a structural assembly that transmits and measures linear forces along and moments about three orthogonal axes. More particularly, a structural assembly having a nested arrangement of links provides a compact assembly well suited for installation where space is limited.

Commonly, there arise situations where the forces and moments transferred from one loading member to a second loading member need to be ascertained. This information is useful, for example, in designing a bracket that will be used to connect the two loading members together. The determination of the forces and moments transferred through the bracket enable the bracket to be optimized to handle the expected loads with minimal costs.

It might appear that the problem of quantifying forces and moments transmitted through a mounting bracket could be solved by affixing strain gauges to the planar surfaces of the bracket and receiving electric signals from the strain gauges that are proportional to the applied forces and moments. As is well appreciated by those skilled in the art, however, such an approach would not yield the best data. Since the bracket often comprises planar surfaces that are non-orthogonal, the signals received from the strain gauges must be processed taking into account the geometry of the measured bracket. The system would thus not be easily adaptable for different types of mounting brackets, which would make each installation costly and labor-consuming. In addition, since the strain gauges are not located in orthogonal planes, inaccuracies arise from high cross-talk (the likelihood of affecting the reading in one axis from loads in another axis) because of lack of isolation between the strain gauges.

SUMMARY OF THE INVENTION

The present invention provides a structural assembly for transmitting selected forces and moments with respect to a plurality of orthogonal axes. The assembly comprises a plurality of links that are oriented orthogonal to each other in a nested arrangement. By using support brackets and recesses, the plurality of links can be arranged in an overlaying arrangement without interfering with each other to provide a compact assembly with very low cross-talk.

The assembly includes a loading member having a loading member inner surface and a loading member outer surface substantially parallel and opposite the loading member inner surface. A support base is positioned substantially parallel to the loading member and faces the loading member inner surface. An orthogonal support structure is joined to the support base. The orthogonal support structure includes a first support portion and a second support portion. The first support and second support portions are substantially orthogonal to the support base, while the first support portion is substantially orthogonal to the second support portion. The plurality of links include at least three substantially parallel vertical links joining the support base inner surface to the loading member inner surface; at least two substantially parallel longitudinal links joining the first support portion to the loading member; and a lateral link joining the second support portion to the loading member. Each of the links is substantially rigid along a corresponding central longitudinal axis and comprises at least one flexure portion providing compliance about two axes orthogonal to the corresponding central axis. A bounded space is defined by the loading member outer surface, the support base inner surface and the central longitudinal axes of adjacent vertical links. The longitudinal links are joined at ends to the loading member such that a plane defined by the central longitudinal axes of the longitudinal links, which is bounded by a line joining the ends, intersects with the bounded space.

The present invention is well suited to transmit and measure forces and moments where space is limited. For example, the present invention can replace a support of a vehicle that is used to connect a first portion of the vehicle to a second portion of the vehicle. In this preferred installation, the loading member is joined to the first portion of the vehicle and the support base is attached to the second portion. The vertical links are then aligned to support and transfer the static weight of the vehicle. The assembly thus provides a load cell having very low cross-talk to measure forces orthogonal to the weight of the vehicle, forces of which can be considerably less than the static weight of the vehicle.

DETAILED DESCRIPTION OF THE PREFERRED EMBODIMENTS

Figure 1:
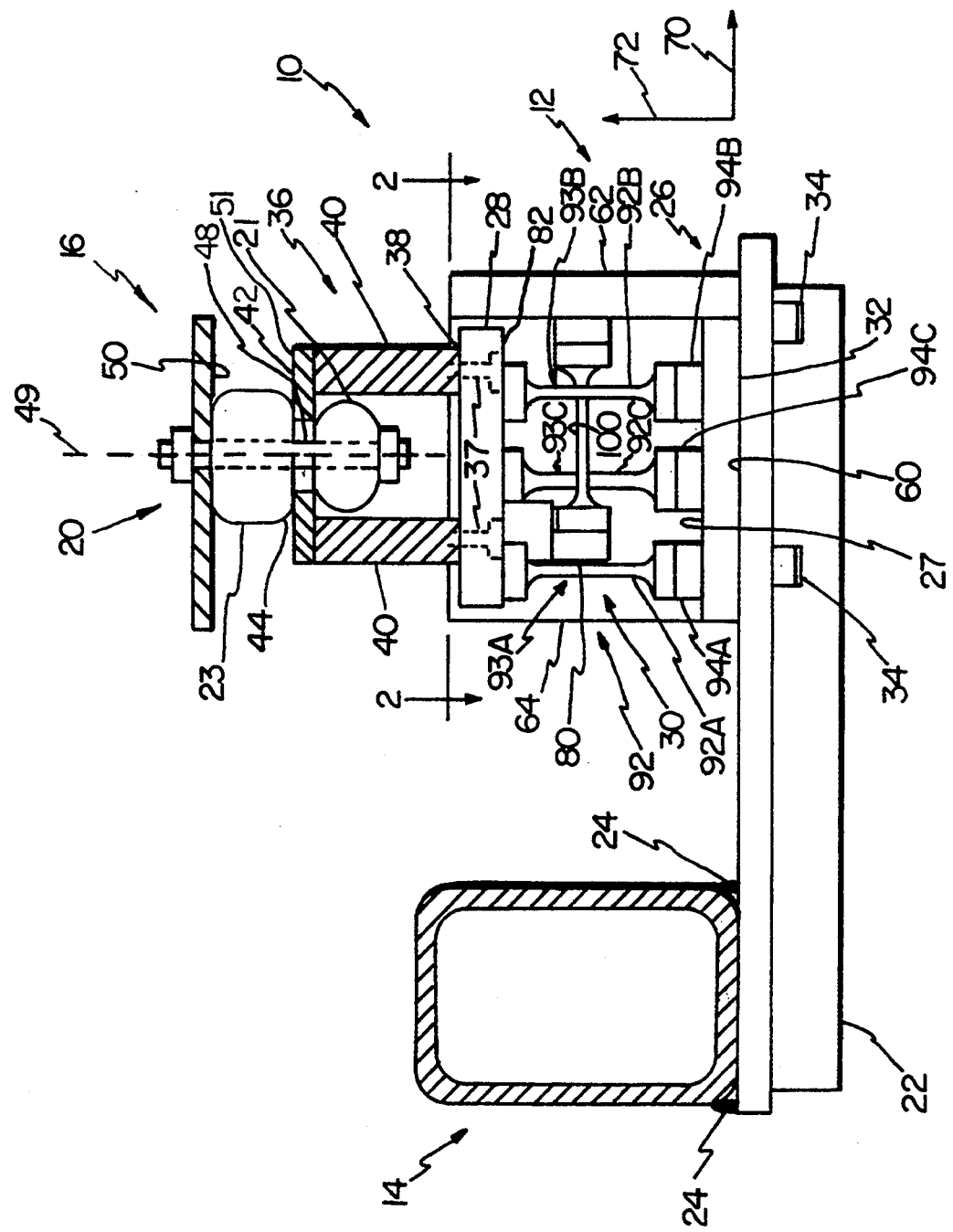
FIG. 1 is a partial sectional view of a force and moment transmitting assembly made according to the present invention incorporated as part of a vehicle chassis testing system.

A dynamic testing system for testing vehicle chassis performance is shown generally at 10 in FIG. 1. The testing system 10 includes a force transmitting and isolating assembly 12 coupled between a chassis member 14 and a body 16 of a vehicle. The testing system 10 replaces a chassis-body mounting bracket normally used to support the body 16 relative to the chassis member 14. The assembly 12 maintains the desired orientation between the body 16 and the chassis member 14, while isolating and measuring forces and moments with respect to three orthogonal axes.

The assembly 12 is located substantially below and connected to a conventional body mount 20 having a lower bushing 21 and an upper bushing 23. A brace or bracket 22 conventionally fastened to the chassis member 14, such as with welds 24, supports the assembly 12 in the desired position. The assembly 12 includes a first loading member 26 and a second loading member 28. The support bracket 22 is secured to the first loading member 26 on a lower surface 32 conventionally, for example, using suitable threaded bolts 34. A plurality of nested links 30 joins the first loading member 26 to the second loading member 28, allowing movement therebetween in six degrees of freedom.

A bushing mount 36 fastens the body 16 to the assembly 12. The bushing mount 36 is secured to an upper surface 38 of the second loading member 28 with suitable bolts 37. The bushing mount 36 is connected to the body 16 using the body mount 20. The bushing mount 36 includes a cylindrical support wall 40 joined to an upper plate 42. The upper plate 42 has an aperture 44. The bushing mount 36 receives a body mounting bolt 48 through the aperture 44. When the body mounting bolt 48 is tightened, the lower bushing 21 is compressed against a lower surface of the upper plate 42, while the upper bushing 23 is compressed between an upper surface 51 and a lower surface 50 of the upper plate 42 and body 16, respectively.

Figure 2:
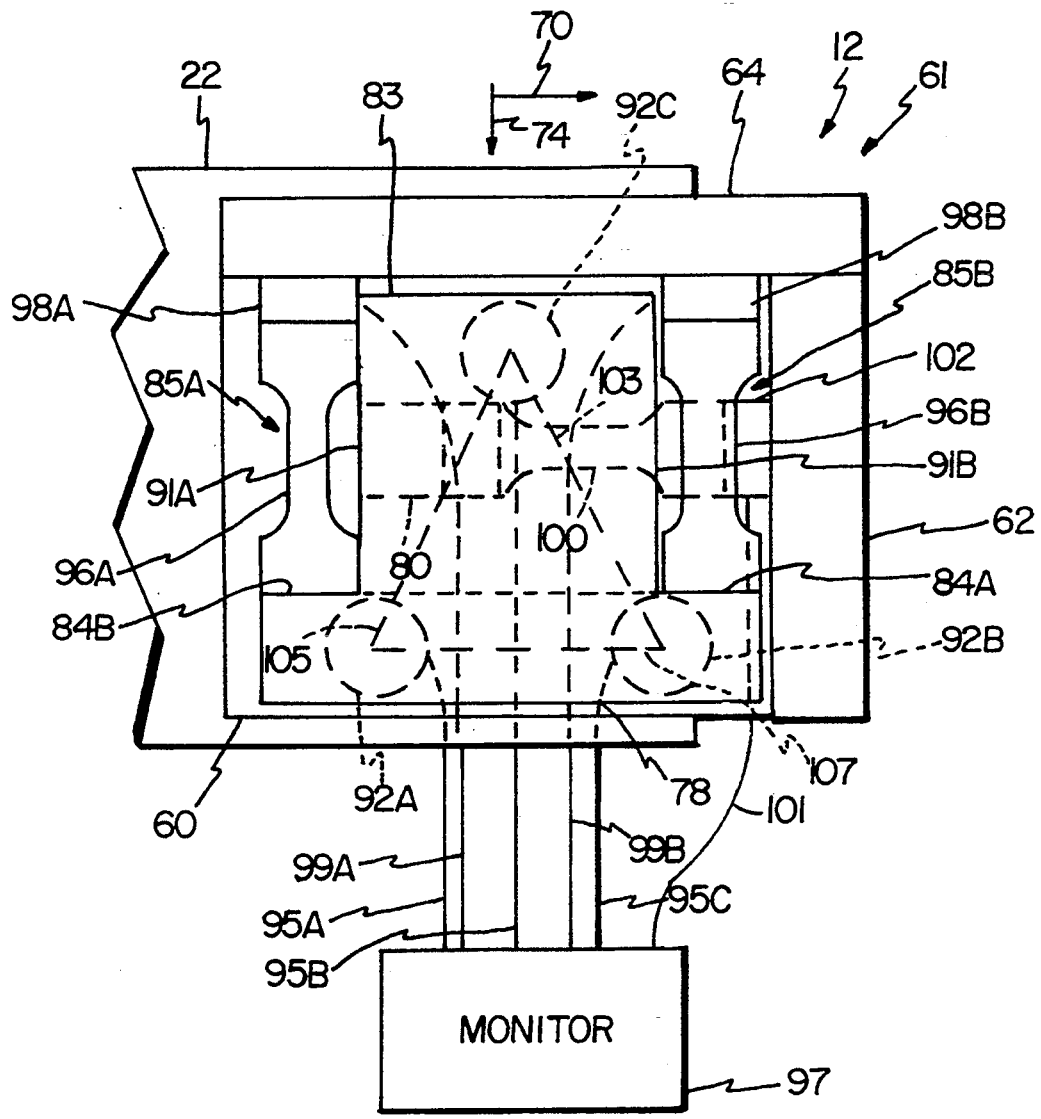
FIG. 2 is a top view taken as on line 2—2 in FIG. 1.

Referring also to FIG. 2, the first loading member 26 includes a support plate 60 and orthogonal support means 61 formed from support plates 62 and 64. The support plate 60 is mounted to the support bracket 22 using the mounting bolts 34, while the second support plate 62 is joined to the support plate 60 and oriented such to be generally perpendicular thereto. The third support plate 64 is oriented to be substantially perpendicular to both the support plate 60 and the support plate 62. In other words, the support plates 60, 62 and 64 are joined at substantially right angles and aligned with three orthogonal reference axes 70, 72 and 74, wherein the support means 61 or support plates 62 and 64 are generally parallel to a longitudinal axis 49 of the body mounting bolt 48.

As stated above, the second loading member 28 is joined to the first loading member 36 with a plurality of nested links 30. The second loading member 28 includes a mounting plate 78. A support bracket 80 joined to a lower surface 82 of the mounting plate 78 projects downwardly toward the support plate 60. Extending flanges 84A and 84B project outwardly from the mounting plate 78. The extending flanges 84A and 84B are formed from recesses 85A and 85B, respectively, cut inwardly from a common perimeter edge 83. The support bracket 80 and the recesses 85A and 85B allow nested placement of the links 30 to provide a compact assembly. As will be described below, at least one link is substantially aligned parallel to each of the reference axes 70, 72 and 74. The links 30 transmit and isolate forces and moments transferred between the first loading member 26 and the second loading member 28 with respect to the reference axes 70, 72 and 74.

A plurality of vertical links 92, connected between the support plate 60 and the plate 78, support the static weight of the body 16 and transfer the vehicle weight to the chassis member 14 through the support bracket 22. In the embodiment illustrated, three vertical links 92A, 92B and 92C, arranged generally to form an equilateral triangle, are used. The links 92A-92C include flexure portions 93A, 93B and 93C that are substantially rigid for forces transmitted generally along axis 72, but substantially compliant for forces and moments along and about all remaining axes. Suitable sensing devices 94A, 94B and 94C, such as piezo-electric sensing devices, are conventionally mounted between each link 92A-92C and the support plate 60 and provide a representative electric signal on signal lines 95A, 95B and 95C proportional to the force transmitted by each corresponding link. The signal lines 95A-95C are connected to a monitor 97. By summing the signals received from sensing devices 94A-94C, the monitor 97 determines the force transmitted along axis 72. Moments about the axes 70 and 74 can be conventionally determined from the difference between the signals. The monitor records the transmitted forces and moments, providing a visual indication if desired.

Two longitudinal links 96A and 96B isolate and transmit forces along the axis 74. Like the links 92A-92C, the links 96A and 96B have flexure portions that are substantially rigid for forces transmitted along each of their longitudinal axes, while being substantially compliant to all remaining forces and moments. Each link 96A and 96B is connected to the mounting plate 78 on each of the extending flanges 84A and 84B, respectively. The links 96A and 96B each have a maximum diameter approximately equal to the cross-sectional width of the mounting plate 78 so as to keep the assembly 12 compact. Sufficient clearance is provided between the links 96A and 96B and side walls 91A and 91B, respectively, to allow movement of the plate 78. Sensing devices 98A and 98B, similar to sensing devices 94A-94C located between link 96A and link 96B, respectively, and the support plate 64 provide a representative signal on signal lines 99A and 99B proportional to the force transmitted within each link. By summing the signals from sensing devices 98A and 98B, the monitor 97 determines the force transmitted along axis 74. The moment about axis 72 is conventionally determined from the difference of the signals.

A lateral link 100 is located between the support bracket 80 and the support wall 62 to transmit forces along the axis 70. The link 100 has a flexure portion that is substantially rigid to transmit forces along the axis 70 and substantially compliant to all remaining forces and moments. A sensing device 102, similar to sensing devices 94A-94C, located between the link 100 and the support wall 62 responds to the forces transmitted along the axis 70. The sensing device 102 provides a proportional electric signal on signal line 101 which in turn is received by the monitor 97 to determine the force along the axis 70.

Figure 3:
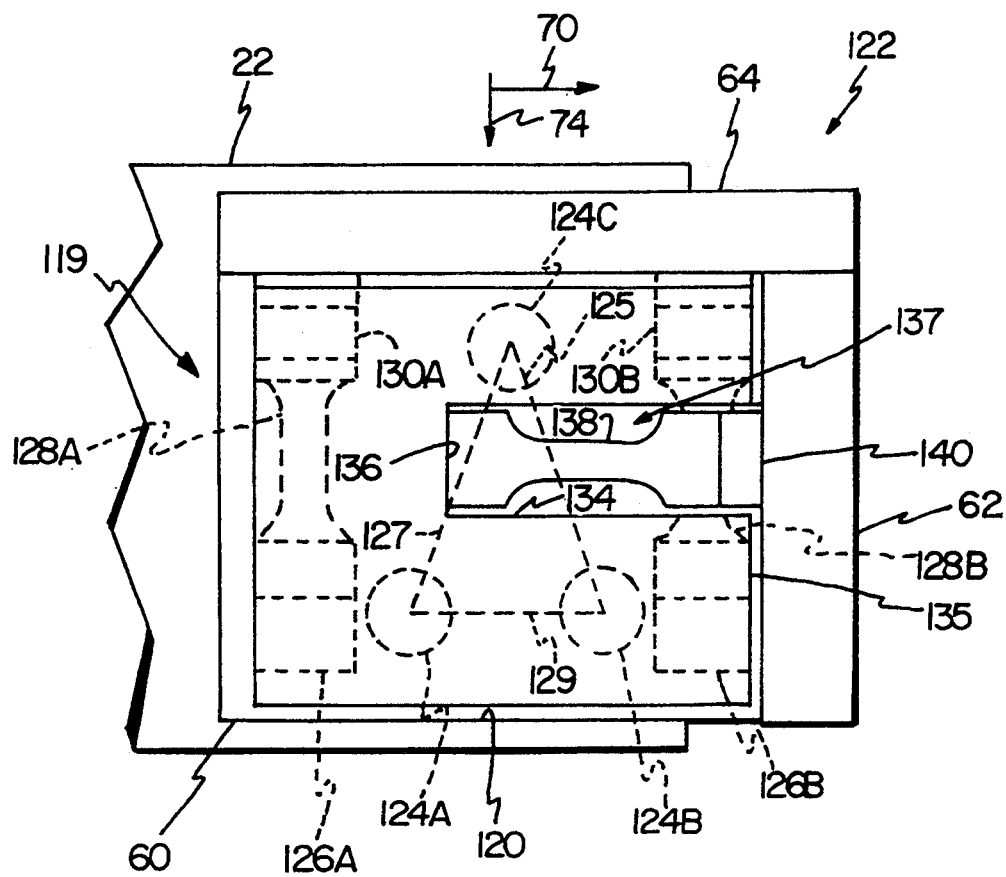
FIG. 3 is a top view of a second embodiment with parts broken away.

FIG. 3 illustrates a second arrangement for connecting the first loading member 26 to a second loading member 120 to form an assembly 122. Like the assembly 12 described above, the assembly 122 includes a plurality of nested links 119 that comprise three vertical links 124A, 124B and 124C. The vertical links 124A-124C join a lower surface of the second loading member 120 to the support plate 60. The vertical links 124A-124C transmit forces along the axis 72 and include sensing devices similar to 94A-94C to provide electrical signals representing the applied load.

Like the assembly 12 described above, the second loading member 120 includes downwardly projecting support brackets 126A and 126B. The support brackets 126A and 126B are similar to the support bracket 80 of the previous embodiment and are used to secure a corresponding longitudinal link 128A and 128B, respectively, to the support plate 64. The links 128A and 128B transmit forces along the axis 74 and include sensing devices 130A and 130B to provide electrical signals proportional to the forces. The second loading member 120 is U-shaped having a recess or slot 134 formed partially therein from a perimeter edge 135. The slot 134 forms a mounting surface 136 that is used to secure a lateral link 138. The lateral link 138 transmits forces along the axis 70 and includes a suitable sensing device 140 for providing an electric signal proportional to the transmitted forces. Like the longitudinal links 96A and 96B of the previous embodiment, the lateral link 138 has a maximum diameter approximately equal to the cross-sectional width of the second loading member 120 to save space.

Figure 4:
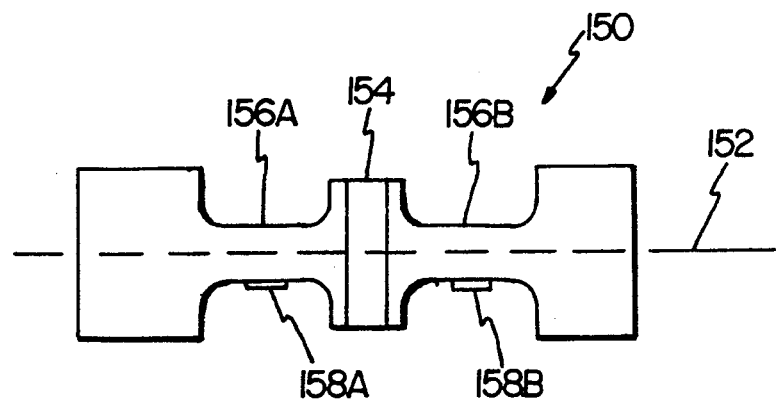
FIG. 4 is a top view of a second embodiment of a connecting link.

FIG. 4 illustrates a second embodiment of a support link indicated generally at 150. The support link 150 has a central longitudinal axis 152. A sensing device 154 is mounted between flexure portions 156A and 156B and responds to forces along the central longitudinal axis 152. Like the flexure portions of the links described above, the flexure portions 156A and 156B are substantially rigid for forces along the central longitudinal axis 152 and substantially compliant to remaining forces and moments orthogonal to the central longitudinal axis 152. Preferably, the sensing device 154 is a piezo-electric sensing device.

It should be further understood that strain gages can be used instead of the piezo-electric sensing devices herein depicted. For example, strain gages 158A and 158B can be conventionally mounted to the flexure portions 156A and 156B of the link 150 to respond to the transmitted longitudinal forces.

As illustrated in FIGS. 1-3, the links 30 and 119 of assemblies 12 and 122, respectively, are arranged to provide a compact structure. Location of the longitudinal links with respect to the vertical links provides a first level of compactness. Referring to FIGS. 1 and 2, a bounded space is defined by the upper surface 38 of the second loading member 28, an inner surface 27 of the support plate 60 and the central longitudinal axes of the links 92A-92C. As illustrated in FIG. 2, the central longitudinal axes of links 92A-92C define adjacent planes 103, 105 and 107. The longitudinal links 96A and 96B are connected to the second loading member 28 such that a plane defined by the central longitudinal axes of the longitudinal links 96A and 96B, and which is bounded by a line joining the ends of the longitudinal links connected to the flanges 84A and 84B, intersects with the bounded space.

Like the longitudinal links 96A and 96B in the assembly 12, the longitudinal links 128A and 128B in the assembly 122 also define a plane that intersects with a bounded space defined by the upper surface of the loading member 120, the lower surface 27 of the support plate 60 and the central longitudinal axes of the vertical links 124A-124C. Referring to FIG. 3, the bounded space is defined by adjacent planes 125, 127 and 129 formed by the central longitudinal axes of the vertical links 124A-124C. The longitudinal links 128A and 128B are mounted to the support brackets 126A and 126B, respectively. Since the longitudinal links 128A and 128B are mounted above the inner surface 27 and below the loading member 120, a plane defined by the central longitudinal axes of the longitudinal links 128A and 128B having a boundary end line defined by connections to the support brackets 126A and 126B intersects with the bounded space.

Compactness of the assemblies 12 and 122 is also achieved by mounting at least one link in a recess formed in the first loading member and mounting the orthogonal link in a plane below the recessed link. Referring to FIG. 2, the longitudinal links 96A and 96B are mounted in the recesses 85A and 85B, respectively, while the lateral link is mounted to the support bracket 80 to lie in a plane below the longitudinal links 96A and 96B. Whereas, referring to FIG. 3, the positioning of the longitudinal links and the lateral link are reversed. The lateral link 138 is mounted in a recess 137, while the longitudinal links 128A and 128B are mounted with brackets 126A and 126B, respectively, to lie in a plane below the lateral link 138.

In summary, the present invention provides a compact six axis force transducer well suited for locations where space is limited. The assembly comprises a plurality of links that are oriented orthogonal to each other in a nested arrangement. By using support brackets and recesses, the plurality of links can be arranged in an overlaying arrangement without interfering with each other to provide a compact assembly.

Although the present invention has been described with reference to preferred embodiments, workers skilled in the art will recognize that changes may be made in form and detail without departing from the spirit and scope of the invention.

What is claimed is:

1. A load cell for measuring selected forces and moments with respect to a plurality of orthogonal axes, the assembly comprising:
   a loading member having a loading member inner surface and a loading member outer surface substantially parallel and opposite the loading member inner surface;
   a support base substantially parallel to the loading member having a support base inner surface facing the loading member inner surface;
   orthogonal support means joined to the support base, the support means having a first support portion and a second support portion, wherein the first and second support portions are substantially orthogonal to the support base inner surface, and wherein the first support portion is substantially orthogonal to the second support portion; and
   at least three substantially parallel vertical links joining the support base inner surface to the loading member inner surface;
   at least two substantially parallel longitudinal links oriented perpendicularly to the vertical links joining the first support portion to the loading member;
   a lateral link oriented perpendicularly to the vertical links joining the second support portion to the loading member; and
   wherein each link is substantially rigid along a corresponding central longitudinal axis and comprises at least one flexure portion providing compliance about two axes orthogonal to the corresponding central axis; a bounded space is defined by the loading member outer surface, the support base inner surface and the central longitudinal axes of adjacent vertical links; and the longitudinal links are joined at ends to the loading member such that a plane defined by the central longitudinal axes of the longitudinal links intersects with the bounded space; and
   force sensing means for sensing a force along one of the central longitudinal axes corresponding to at least one of the links and providing a representative force output signal.

2. The load cell as specified in claim 1 wherein the force sensing means senses the force along the central longitudinal axis of each link.

3. The load cell as specified in claim 1 wherein the force sensing means comprises a piezo-electric force measuring device rigidly connected in series along the corresponding central longitudinal axis of the link.

4. The load cell as specified in claim 1 wherein the force sensing means comprises a strain sensor joined to the corresponding flexure portion of one of the links.

5. The load cell as specified in claim 1 and further including a support member joined to the loading member inner surface, the ends of the longitudinal links being joined to the support member.

6. The load cell as specified in claim 5 wherein the support member comprises two spaced apart support brackets.

7. The load cell as specified in claim 5 wherein the loading member includes a recess extending from a perimeter edge of the loading member, the lateral link being located in the recess.

8. The load cell as specified in claim 1 wherein the loading member includes two recesses extending from a common perimeter edge of the loading member, one of the longitudinal links being located in each of the recesses.

9. The load cell as specified in claim 8 and a support member joined to the loading member inner surface, the lateral link joined to the loading member at the support member.

10. The load cell of claim 1 wherein the ends of the longitudinal links are joined to the loading member and define a boundary line, the boundary line intersecting with the bounded space.

11. A load cell used to replace a support of a vehicle, the load cell mounted between a first portion of the vehicle and a second portion of the vehicle, the load cell transmitting and measuring selected forces between the first portion of the vehicle and the second portion of the vehicle with respect to a plurality of orthogonal axes, the load cell comprising:
- a loading member having a loading member inner surface and a loading member outer surface substantially parallel and opposite the loading member inner surface;
- a support base substantially parallel to the loading member having a support base inner surface facing the loading member inner surface;
- orthogonal support means joined to the support base, the support means having a first support portion and a second support portion, wherein the first and second support portions are substantially orthogonal to the support base inner surface, and wherein the first support portion is substantially orthogonal to the second support portion; and
- at least three substantially parallel vertical links joining the support base inner surface to the loading member inner surface;
- at least two substantially parallel longitudinal links oriented perpendicularly to the vertical links joining the first support portion to the loading member;
- a lateral link oriented perpendicularly to the vertical links joining the second support portion to the loading member; and
- wherein each link is substantially rigid along a corresponding central longitudinal axis and comprises at least one flexure portion providing compliance about two axes orthogonal to the corresponding central axis and a force sensing means for sensing a force along the central longitudinal axis of the link;
- a bounded space is defined by the loading member outer surface, the support base inner surface and the central longitudinal axes of adjacent vertical links; and the longitudinal links are joined at ends to the loading member such that a plane defined by the central longitudinal axes of the longitudinal links intersects with the bounded space; and
- force sensing means for sensing a force along one of the central longitudinal axes corresponding to at least one of the links and providing a representative force output signal.

12. The load cell as specified in claim 11 wherein the force sensing means comprises a piezo-electric force measuring device rigidly connected in series along the corresponding central longitudinal axis of the link.

13. The load cell as specified in claim 11 wherein the force sensing means comprises a strain sensor joined to the corresponding flexure portion of one of the links.

14. The load cell as specified in claim 11 and further including a support member joined to the loading member inner surface, the ends of the longitudinal links being joined to the support member.

15. The load cell as specified in claim 14 wherein the support member comprises two spaced apart support brackets.

16. The load cell as specified in claim 14 wherein the loading member includes a recess extending from a perimeter edge of the loading member, the lateral link being located in the recess.

17. The load cell as specified in claim 11 wherein the loading member includes two recesses extending from a common perimeter edge of the loading member, one of the longitudinal links being located in each of the recesses.

18. The load cell as specified in claim 17 and support member joined to the loading member inner surface, the lateral link joined to the loading member at the support member.

19. The load cell of claim 11 wherein the ends of the longitudinal links are joined to the loading member and define a boundary line, the boundary line intersecting with the bounded space.

* * * * *